March 26, 1929. E. E. GULLION 1,706,525
SHEET METAL PIPE
Filed May 17, 1926
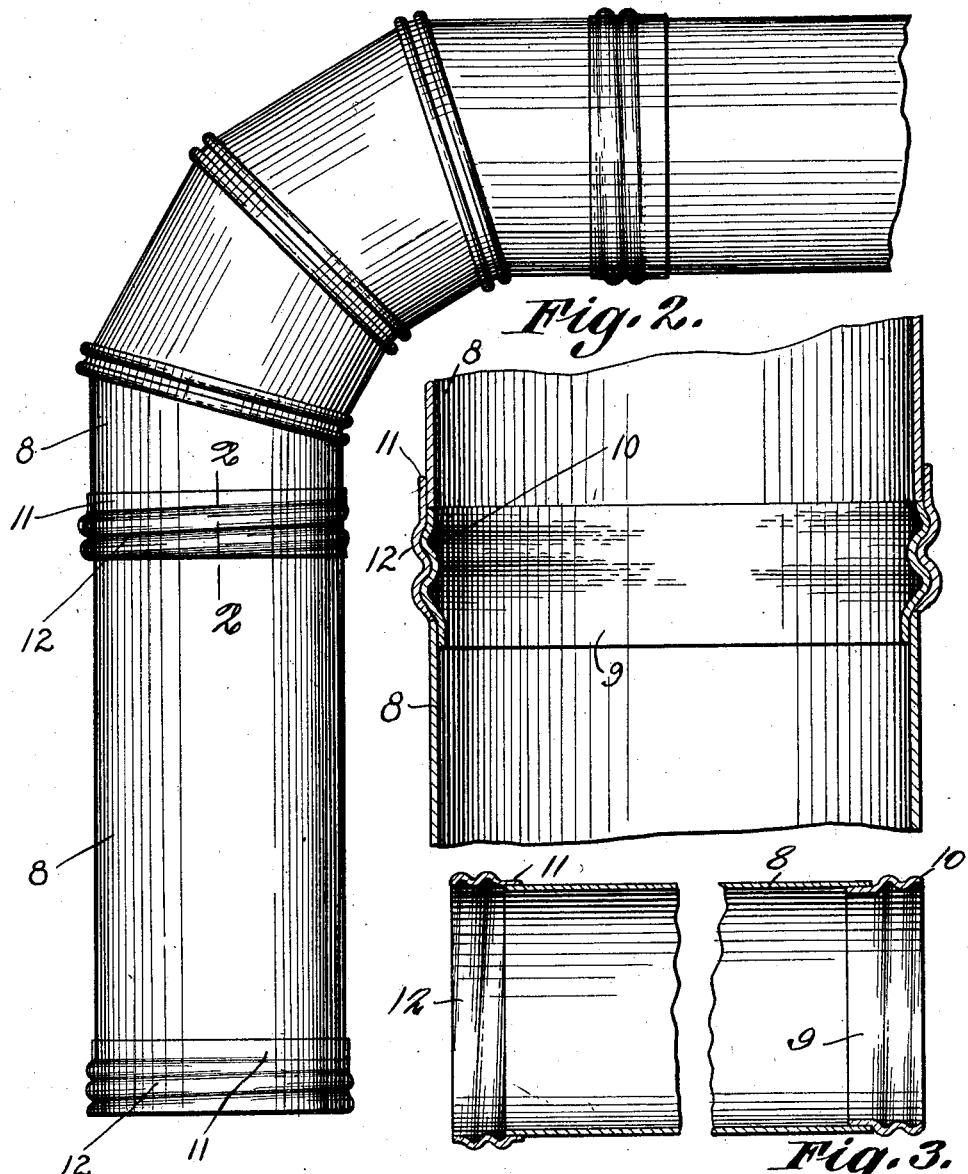

Patented Mar. 26, 1929.

1,706,525

UNITED STATES PATENT OFFICE.

ELMER E. GULLION, OF KOKOMO, INDIANA.

SHEET-METAL PIPE.

Application filed May 17, 1926. Serial No. 109,657.

This invention aims to provide novel means whereby a sheet metal pipe may be held together without the use of wires, keys and the like.

In the drawings:—

Figure 1 shows in elevation, a device constructed in accordance with the invention;

Figure 2 is a fragmental section taken about on the line 2—2 of Figure 1; and

Figure 3 is a sectional detail illustrating a modification, parts being broken away.

The device claimed includes sections 8 of sheet metal pipe each provided at one end with a sheet metal internal collar 9, and provided at its opposite end with a sheet metal external collar 11, the internal collar 9 having a male thread 10, the external collar having a female thread 12, and the collars 9—11 being secured to the pipe sections, to form reinforcements for the ends of the pipe sections, the internal collar 9 of one pipe section being threaded into the external collar 11 of the other section.

The invention may be embodied in sheet metal pipes of any kind, such as stove pipes, furnace flues and the like.

What is claimed is:—,

Sections of sheet metal pipe each provided at one end with a sheet metal internal collar, and provided at its opposite end with a sheet metal external collar, the internal collar having a male thread, the external collar having a female thread, and the collars being secured to the pipe sections, to form reinforcements for the ends of the pipe sections, the internal collar of one pipe section being threaded into the external collar of the other pipe section.

In testimony that I claim the foregoing as my own, I have hereto affixed my signature.

ELMER E. GULLION.